United States Patent Office 3,175,991
Patented Mar. 30, 1965

1

3,175,991

ZINC-FILLED COATING COMPOSITION FROM A CARBOXYL-CONTAINING INTERPOLYMER AND A METAL OXIDE, HYDROXIDE, OR CARBONATE

Morris Levine, Cleveland Heights, and Charles H. Reed, Lakewood, Ohio, assignors to Pittsburgh Plate Glass Company, Pittsburgh, Pa., a corporation of Pennsylvania No Drawing. Filed Mar. 10, 1961, Ser. No. 94,682
10 Claims. (Cl. 260—41)

This invention relates to electrically conductive protective coating compositions. More particularly this invention relates to an electrically conductive thixotropic gel composition comprised of an interpolymer, a comminuted metal and a gelling agent.

Both electrically conductive and corrosion resistant coatings have long been known in the art. They have been used for a great variety of purposes such as, for example, coating polymeric sheeting for the purpose of reducing the accumulation of electrostatic charges and the inside of cathode ray tubes to provide an electrically conductive coating having a substantially nonreflecting matte surface.

In recent years with the advent of "unitized" body construction, that is, the technique of manufacturing a frameless automobile body, there has been an increase in use of resistance welding (spot welding) in fabricating car bodies from mild steel pressings. The use of electrically conductive protective coatings have been employed extensively in an effort to overcome problems of protecting the inner surfaces of the mild steel pressing in the unitized body construction.

Moreover, it is important to note that when the mild steel pressings which are used in the manufacture of automobile bodies are not assembled immediately after fabrication, they are subject to corrosion and, therefore, serious problems occur in spot welding of the individual parts to one another. If the parts are painted with conventional materials before assembly, the high electrical resistance of the paint makes welding impossible unless paint is removed in the region of the weld. If the inner surfaces near the weld are not painted before assembly, it is difficult if not impossible to insure that paint reaches these surfaces in subsequent operations. Because of this fact, the parts have been covered with grease instead of paint when they are stored or shipped.

By using electrically conductive protective coatings, the need for removing paint or grease in the region of the weld from previously coated parts is obviated while, at the same time, the various structural components may be stored for extended periods of time, or exported with the assurance that they are protected against corrosion or damage to the surface which will affect the quality of the spot weld.

The standard resistance (spot) welding equipment which is used most extensively in the automotive industry operates by impressing about four volts across two ⅝ inch diameter electrodes. In order to produce enough heat to weld the automobile body parts together, a current ranging from 8,000 amperes to 10,000 amperes must flow across the electrodes. In addition to providing this high degree of conductance and corrosion resistance, it is also necessary that the coating composition not have a deleterious effect on the structure of the welded joint.

Many of the electrically conductive welding primers which are obtained commercially use zinc to provide necessary conductivity for welding. Although comminuted zinc has been used most extensively for this purpose, other metals such as nickel, stainless steel, aluminum, chromium, manganese, or cadmium may also be utilized—U.S. Patents 2,718,506 and 2,726,308.

2

In order to obtain sufficient conductivity, the above-mentioned electrically conductive metal particle-containing compositions must have an abnormally large amount of metal particles present in proportion to the resins solids content of the composition. As a result, the coatings are usually underbound and the compositions are fairly unstable because the rate of settlement of the metallic particles is high. Even after the coating is applied to the metal surface there is a tendency for the metal particles to separate from the resin binder before it is fully cured, with the result that an insulating or highly electrically resistant film is formed on the top of the coating. The coatings are usually applied as an abnormally thin film in order to preserve the conductance, but such thin films do not give adequate corrosion protection and the shortage of binder leaves the coating vulnerable to attack from water and moisture such as found in high humidity environments, whereby it becomes muddy and flaky.

There have been attempts to eliminate the need for large quantities of the metal particles by employing non-oxidizing magnetic metal powders which tend to "link up" to form conductive "chains" in the paint film which supposedly results in a greater number of conductive "chains" per weight of metallic particles than are obtained from the haphazard arrangement of the same proportion of non-magnetic materials. While these compositions have been utilized with a degree of success, the problem of settling upon aging has not been eliminated and the high cost of the magnetic metallic particles has seriously hampered their use commercially.

When zinc particles are used as the conductive medium for these electrically conductive primer compositions, there is also a serious problem of hydrogen formation when the standard alkyd resin vehicles are employed. The fact that hydrogen gas is formed during storage of the admixed materials makes it necessary that there be only a short time between the mixing and the use of these compositions. In other words, they should be used or sold as a two-package system where the zinc particles are added immediately prior to their application. Moreover, the presence of the soap which is formed from the saponification has an adverse effect on the welding characteristics of the coating. After the zinc particles have been added to the resinous vehicle, it is frequently necessary that a hygroscopic substance be added to the composition to prevent the zinc from reacting with any moisture which may be present.

Because the standard alkyd type resins which are used as the vehicle in most of these electrically conductive compositions are easily saponifiable, they also are attacked by any residual alkali left on the surface of the pressings after the surface has been cleaned with an alkaline cleaning solution prior to the coating said surface.

It has now been discovered that extremely good electrically conductive protective compositions can be made by first forming a gel with a basic metallic compound and a polymer comprising (1) at least one member of the group consisting of a styrene and an alkyl ester of acrylic acid or an alpha alkyl acrylic acid and (2) from about 0.25 percent to about 5 percent by weight of at least one unsaturated carboxylic acid polymerized therewith, and admixing metal particles therewith in sufficient amounts to obtain electrical conductivity.

The various monomers which may be used in preparing the interpolymers for use in forming the gels of the instant invention are defined by the following structure:

(I)

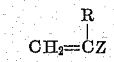

wherein R is at least one member of the group consisting of hydrogen and an alkyl radical having from 1 to 6 carbon atoms and Z represents at least one member of the group consisting of

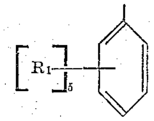

wherein $R_1$ is at least one member of the group consisting of hydrogen, a halogen and an alkyl radical having from 1 to 6 carbon atoms and $R_2$ is an alkyl radical having from 1 to 20 carbon atoms.

Examples of compounds which fall within the definition of the above formula I include the alkyl esters of acrylic and methacrylic acid which have been formed with alcohols ranging from those having lower alkyl groups, such as methanol, ethanol, propanol, butanol, pentanol, hexanol and heptanol through those having higher alkyl groups such as octanol, nonanol, decanol, undecanol, dodecanol, tridecanol, tetradecanol, pentadecanol, hexadecanol and heptadecanol. The various styrenes such as styrene, methyl and dimethyl styrene, fluoro, chloro and bromo styrene, alpha methyl styrene and other alkyl substituted styrenes are also examples of compounds represented by Formula I.

It is also desirable that the metal particles have a higher oxidation potential than the metal surface to which the coating composition is to be applied in order to obtain a corrosion resistance due to the internal battery action of the sacrificial metal particles. The resinous gels of this invention provide a means for keeping the metallic particles in suspension and since they are not reactive therewith there is no problem with stability. Moreover, uniform distribution of the metallic particles throughout the resulting coating film after application makes it possible to use considerably less metal than is presently used with the standard alkyd vehicles and at the same time it is possible to insure the maintenance of uniform welding characteristics.

The gels, which are formed from the reaction of the above-described interpolymers with a soap-forming metal compound such as sodium carbonate, calcium hydroxide, zinc oxide, zinc hydroxide, zinc carbonate, barium hydroxide, or magnesium hydroxide, have been found to be thixotropic and reversible and can be controlled to a certain extent by the amount of solvent which is blended with the interpolymer.

The expression "soap-forming metal" is intended to include any metal which is capable of forming a salt with a carboxylic acid, more specifically, those metals which react with the carboxyl groups (derived from the unsaturated carboxylic acid component) which form an integral part of the above-mentioned interpolymers.

While the above-listed compounds are preferred because they are readily available economically and in commercial quantities, and because only very small amounts of these materials are necessary (as little as 0.007 percent by weight of the metal particle free composition) to gel the said interpolymers, other well known soap forming metals may be employed in compound form.

Included among these metals are those which are classified as siccative metals and those which form insoluble soaps. For a more complete and detailed disclosure of the various metals which may be used with the instant invention reference is made to K. S. Markley, Fatty Acids: Their Chemistry and Physical Properties, Interscience Publishers Inc., New York, New York, pp. 250–253 (1947).

Some of the compounds of the soap-forming metals are required in larger amounts than others. In other words, the gel-forming efficiency of the said compounds varies. The minimum amounts of each metal compound are easily determined by grinding or intimately dispersing a range of amounts of the metal compounds with test tube quantities of the gel-forming interpolymer and observing the amount necessary to form a gel within about 24 hours. The texture of the gel can be adjusted also by controlling the amounts of the soap-forming metal compound.

In its broad aspect, the instant invention is characterized by a composition comprising (1) the above-described interpolymers in solution with a non-aqueous solvent, (2) a small amount of at least one of the alkaline soap-forming metal compounds, and (3) a sufficient amount of metallic particles to provide for electrical conductance, and, optionally, (4) a corrosion inhibiting compound.

While the acrylates, methacrylates and styrenes defined by the above-mentioned structural Formula I form thixotropic reversible gels which may be used advantageously as a suspending and coating vehicle for the metallic particles, it is desirable to interpolymerize other monomers therewith which will enhance the other required properties of the coating such as adhesion, flexibility, impact resistance, and the like. Moreover, certain advantages are obtained by incorporating limited amounts of other resins such as vinyl resins, epoxy resins, melamine-formaldehyde resins, and the like. It is also important that these other additives do not lessen the weldability; that is, that there be no adverse after-effect on the structure of the weld joint.

In order to obtain good flexibility of the coating composition, it is desirable to interpolymerize at least one monomer which is known to form hard homopolymers such as methyl methacrylate and/or styrene or vinyl toluene and one plasticizing type monomer such as ethyl acrylate, 2-ethylhexyl acrylate, dibutyl itaconate, and lauryl methacrylate. In addition to these monomers other $CH_2=C<$ containing monomers can be also employed with good results. These include, but are not limited to, monoolefinic hydrocarbons such as alpha methyl styrene, alpha ethyl styrene, isobutylene and the like; esters of organic and inorganic acids such as vinyl propionate, vinyl butyrate, vinyl isobutyrate, propyl methacrylate, butyl methacrylate, methyl acrylate, butyl acrylate, 3,5,5-trimethylhexyl acrylate, isopropenyl acetate, isopropenyl propionate, allyl butyrate, dimethyl maleate, diethyl maleate, diallyl maleate, and the like.

It has been found that it is desirable to have a certain amount of nitrile groups present in the interpolymer to improve corrosion resistance of the coated surface. This can be accomplished by interpolymerizing a nitrile of an unsaturated carboxylic acid such as acrylonitrile in amounts of up to 15 percent by weight of the interpolymer. Methacrylonitrile and ethacrylonitrile may be substituted in place thereof in the same general amounts.

In order to enhance the formation of the gel structure, it is necessary to include in the interpolymer an unsaturated carboxylic acid component in amounts ranging from about 0.25 percent to about 5 percent by weight, but preferably between 1 percent and 2 percent. Any one of the ethylenically unsaturated monocarboxylic acids such as acrylic acid, methacrylic acid, 3-butanoic acid, angelic acid, tiglic acid and the like may be employed; ethylenically unsaturated dicarboxylic acids such as maleic acid or fumaric acid may be also utilized if desired.

The formulation of the electrically conductive metallic particles containing compositions is preferably carried out by forming a solution of the above-mentioned interpolymers with a non-aqueous organic solvent which may be any relatively inexpensive hydrocarbon or ketone and the like. To the solution, which may contain from 40 percent to about 90 percent by weight solvent, is added from about 0.007 percent to about 5 percent by weight of one of the afore-mentioned basic soap-forming metal compounds. Within a few hours after the addition of the soap-forming metal compound, a thixotropic gel structure is formed which can, if desired, be liquified by adding as little as 0.05 percent by weight of water.

It is also possible to add more solvent in amounts of as much as 20 percent by weight of the entire composition. The excess solvent will tend to lower the effect of the gel structure to a certain extent but it is advantageous to do so when the spraying equipment is limited as to the pumping equipment. It has been found, however, that uniform conductance is maintained throughout the applied coating even though the gel itself has been partially liquified. One plausible explanation for this is the fact that the excessive solvent is evaporated during the spraying and the gel is re-established.

The metallic particles are then intermixed with the gel until the particles are homogeneously interdispersed. While it is possible to add the metallic particles prior to the gel formation, it is preferred that the gel structure be acquired first.

Zinc is the preferred agent to provide the electrical conductance. However, any metallic conductor may be used. There is no criticality in the size of the metallic particles, but if the particle size is below 400 mesh the amount of metal necessary to provide conductance per unit weight of binder increases, and if the particle size is above 200 mesh the stability of the uniform distribution of the metal particles decreases.

It is preferred that the metal particles comprise from 40 percent by weight to about 70 percent by weight of the total electrically conductive, corrosion-resistant composition; but, however, it is quite conceivable that many useful compositions can be made using proportions outside of this range. For example, in certain areas of industry where humidity resistance and other strong demands on coatings are not present, it may be desirable to add larger amounts of conductive material so as to enable extremely large currents to pass through the said coating compositions; and, at the same time, it is also conceivable that coatings having less conductance than is demanded by the automotive industry may find considerable utility, especially where the quality of the coating itself is more important than its ability to conduct electricity. Another area where these lower conductive compositions (those containing less than 40 percent metal particles by weight) find utility is in the making of resistors for printed circuits. Because of the extreme inertness of the resin binder to the metal particles, there is very little problem with aging of the printed resistor.

In addition to the above-described electrically conductive gel composition it is desirable to add up to about 6.25 parts by weight of an epoxide resin, particularly a polyglycidyl ether of a bisphenol. It has been found that the presence of these epoxide resins also increases the corrosion resistance, particularly those containing the higher epoxy equivalents (above 500). Optimum results are obtained when the epoxide resin is present in amounts ranging from about 1.25 percent to 2.50 percent by weight of the metallic particle free resinous gel.

The epoxide resin which is utilized in the primer compositions of this invention may vary considerably in chemical structure. These materials, which are ordinarily polyglycidyl ethers of bisphenols, or polyether derivatives of polyhydric phenols containing epoxide groups, are formed by the reaction of bisphenols with epichlorohydrin, and range from viscous liquids to hard, brittle resins. A representative epoxy resin structure may be illustrated as follows:

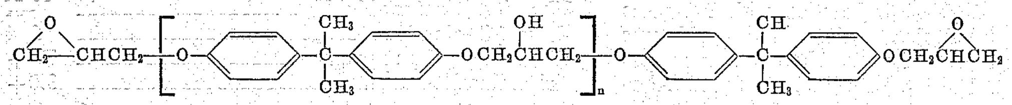

In the foregoing structure, *n* is a number of a magnitude dependent upon the degree to which the etherification is carried. The most simple epoxy resin will be free of functional groups other than epoxide and hydroxyl groups, and will contain at least 4 carbon atoms, as illustrated by 1,2-epoxy-3,4-epoxy butane. More complex epoxy resins, such as those which result from the reaction of two or more moles of a diepoxide with one mole of a dihydric phenol, or from the reaction of three or more moles of a diepoxide with one mole of a trihydric phenol, and diepoxides or polyepoxides derived by polyhydric alcohols such as sorbitol, pentaerythritol, or polyallyl alcohols, may also be used. Among the many phenolic compounds utilized in the preparation of epoxy resins are included the following:

Bis(4-hydroxy-phenyl)2,2-propane
4,4'-dihydroxybenzophenone
Bis(4-hydroxyphenyl)1,1-ethane
Bis(4-hydroxy-phenyl)1,1-isobutane
Bis(4-hydroxy-phenyl)2,2-butane
Bis(4-hydroxy-phenyl)2,2-propane
Bis(4-hydroxy-tertiary butyl phenyl)2,2-propane
Bis(2-hydroxy-naphthyl)methane
1,5-dihydroxy-naphthalene The epoxy component of the epoxy resins may be selected from compounds of the following group:

1-chloro-2,3-epoxy propane (epichlorohydrin)
1-chloro-2,3-epoxy butane
1-chloro-3,4-epoxy butane
2-chloro-3,4-epoxy butane
1-chloro-2-methyl-2,3-epoxy butane
1-bromo-2,3-epoxy pentane
2-chloromethyl-1,2-epoxy butane
1-bromo-4-methyl-3,4-epoxy pentane
1-bromo-4-ethyl-2,3-epoxy pentane
4-chloro-2-methyl-2,3-epoxy pentane
1-chloro-2,3-epoxy octane
1-chloro-2-methyl-2,3-epoxy octane
1-chloro-2,3-epoxy decane Those epoxide resins which are liquids are particularly preferred for the use in the primer compositions of this invention. The liquid epoxide resins normally possess epoxide equivalents (grams of resin containing one gram equivalent of epoxide) below about 300. The liquid resins ordinarily will be of an average molecular weight below 500, and preferably in the range of about 350 to 450. While the liquid resins are much preferred, the solid resins can also be utilized, although compatibility problems are sometimes encountered, making production of the primer considerably more difficult than is the case with the liquid epoxide resins.

It has been found that the presence of a very small amount (0.016 percent of the metallic particle free gel composition) of a melamine-formaldehyde resin or other amine resins such as a urea-formaldehyde resin improves the film continuity and flow characteristics of the composition. While eight times the above amount of melamine-formaldehyde resin may be employed, it is preferred that not more than about three times be used because the permanency of the gel is decreased as the melamine-formaldehyde resin is increased.

While the particulate sacrificial metal may provide both electrical conductance through to the metal surface and corrosion protection of the metal surface, it is desirable to incorporate up to about 15 percent by weight of the gel composition of a corrosion inhibitor and preferably from about 2.55 percent to about 6.75 percent. Particularly useful are many of the chromates and molybdates such as, for example, calcium chromate, lead chromate, zinc chromate, barium chromate, strontium chromate, calcium molybdates, lead molybdates, zinc molybdate, barium molybdate and strontium molybdate. Many other corrosion inhibitors may be used.

In addition to the regular pigmentation, it has been found desirable to add up to 2 percent by weight of the gel composition of carbon black. The reason is not known, but the weldability of the surface is enhanced thereby.

Other pigments such as magnesium silicate (talc) may be added in amounts ranging up to about 3.25 percent by weight. In many instances it may be desirable to add zinc oxide as a pigment in amounts greater than 3.25 percent up to about 20 percent by weight of the metallic particle free resinous composition.

The following examples are given by way of illustration and not by way of limitation. All parts and percentages are by weight unless otherwise specified.

*Example I*

An interpolymer which may be used to form a suitable gel for the conductive composition of the instant invention was prepared as follows:

| | Parts by weight |
|---|---|
| Styrene | 1122.3 |
| 2-ethylhexyl acrylate | 145.0 |
| Acrylonitrile | 162.4 |
| Methacrylic acid | 20.3 |
| Benzoyl peroxide | 1.5 |

The above ingredients were added over a 3-hour period to a vessel containing 725 parts of a high boiling point naphtha (Solvesso 100) at 250° F. The reaction medium was refluxed for another hour and a solution containing benzoyl peroxide (1.5 parts) and 58 parts of the high boiling point naphtha (Solvesso 100) was added over a half-hour period. After refluxing for another hour more naphtha (435 parts) was added. The reaction medium was then refluxed for four consecutive 1½-hour periods during the first half of which a solution containing benzoyl peroxide (1.5 parts) and naphtha (58 parts) was added. Methyl isobutyl ketone (625 parts) was added and the reaction medium was cooled to 225° F., and more methyl isobutyl ketone (100 parts) was added. The final product had the following properties:

| | |
|---|---|
| Solids (percent) | 38.7 |
| Viscosity (Gardner-Holdt) | X |
| Color (Gardner) | 2+ |
| Weight per gallon (pounds) | 7.66 |
| Acid value | 3.71 |

*Example II*

An interpolymer which may be used to form a suitable gel for the conductive compositions of the instant invention was prepared as follows:

| | Parts by weight |
|---|---|
| Styrene | 4983 |
| 2-ethylhexyl acrylate | 726 |
| Acrylonitrile | 1452 |
| Methacrylic acid | 102 |

The above ingredients were admixed with benzoyl peroxide (36 parts) and added continually over a 3-hour period to a solution containing xylene (1452 parts) and 5810 parts of a high boiling aromatic naphtha (Solvesso 100). During the addition the reaction temperature ranged from 230° F. to 270° F. The reaction mass was then refluxed for one hour. The reaction was then carried through five more one-hour periods; during the first one-half hour of each benzoyl peroxide (7.2 parts) in solution with 291 parts of the high boiling aromatic naphtha (Solvesso 100) was added dropwise thereto. After the last addition a large amount of solvent was distilled off (1.52 parts) and Cellosolve acetate (3682 parts) was added thereto. The resinous composition had the following properties:

| | |
|---|---|
| Acid value | 3.9 |
| Weight per gallon (pounds) | 8.06 |
| Solids (percent) | 39.5 |
| Viscosity (Gardner-Holdt) | X+ |
| Color (Gardner) | 4+ |

*Example III*

An interpolymer which may be used to form a suitable gel for the conductive composition of the instant invention was prepared as follows:

| | Parts by weight |
|---|---|
| Methyl methacrylate | 9365 |
| Ethyl acrylate | 4460 |
| Acrylonitrile | 1785 |
| Methacrylic acid | 225 |
| Benzoyl peroxide | 11 |

The above ingredients were admixed and added continually over a 3-hour period to a suitable vessel containing 13,400 parts of high boiling aromatic naphtha (Solvesso 100). After the addition the reaction mass was held at a temperature range between 225° F. and 230° F. for 2 hours. Benzoyl peroxide (11 parts) and 545 parts of high boiling aromatic naphtha (Solvesso 100) were then added over a 1-hour period. The reaction mass was then held at a temperature ranging between 240° F. to 250° F. for 3 hours. During the next three 2-hour periods, a solution containing benzoyl peroxide (11 parts) and 545 parts of high boiling aromatic naphtha (Solvesso 100) was added over the first hour of each 2-hour period. After the last 2-hour period, 4930 parts of high boiling aromatic naphtha (Solvesso 100) was added and the reaction mass was steam stripped for an hour and 20 minutes until 4930 parts of solvent were stripped off. Methyl isobutyl ketone (8200 parts) was added. The resinous composition had the following properties:

| | |
|---|---|
| Solids (percent) | 38±2 |
| Viscosity (Gardner-Holdt) | V–X |
| Color (Gardner) | 4 max. |
| Weight per gallon (pounds) | 7.89 |
| Acid value | 3.89 |

*Example IV*

An interpolymer which may be used to form a suitable gel for the conductive compositions of the instant invention was prepared as follows:

| | Parts by weight |
|---|---|
| Styrene | 887.4 |
| 2-ethyl hexyl acrylate | 98.6 |
| Methacrylic acid | 14 |
| Benzoyl peroxide | 1.0 |

The above ingredients were added over a 3-hour period to a vessel containing 484 parts of a high boiling point naphtha (Solvesso 100) at 250° F. The reaction medium was refluxed for another hour and a solution containing benzoyl peroxide (1.0 part) and the 39 parts of high boiling naphtha (Solvesso 100) was added over a ½ hour period. After refluxing for another hour, more naphtha (290 parts) was added. The reaction medium was then refluxed for four consecutive 1½ hour periods, during the first half of which a solution containing benzoyl peroxide (1.0 part) and naphtha (39 parts) was added. Methyl isobutyl ketone (416 parts) was added and the reaction medium was cooled to 225° F. More methyl isobutyl ketone (67 parts) was added. The final product had the following properties:

| | |
|---|---|
| Solids (percent) | 37±2 |
| Viscosity (Gardner-Holdt) | V–X |
| Color (Gardner) | 2–4 |
| Weight per gallon (pounds) | 7.0+ |
| Acid value | 3.0+ |

The following examples relate to the preparation of one of the preferred electrically conductive coating compositions which may be used to coat mild steel pressings for the construction of automobiles by resistance welding techniques.

*Example V*

| | Parts by weight |
|---|---|
| Calcium chromate | 2.55 |
| Magnesium silicate (talc) | 2.48 |
| Zinc oxide | 0.77 |
| Carbon black pigment | 0.95 |
| Suspending agent (multi-purpose additive, Baker Castor Oil Company) | 0.37 |
| Hydrated lime | 0.014 |
| Melamine-formaldehyde resin solids | 0.016 |
| Resin of Example I | 6.40 |
| Epoxy resin (Epon 834) | 4.95 |
| Xylene | 77.60 |
| Methyl isobutyl ketone | 3.90 |

The above ingredients were homogeneously mixed and allowed to gel over a 24-hour period. An electrically conductive corrosion resistant coating composition was then made by adding zinc particles (543.0 parts) to the above gelled composition (457.5 parts) and mixing them until a homogeneous composition was obtained. Using a high pressure pump, this composition was sprayed at 15 pounds per square inch pot pressure and 60 pounds atomizing pressure onto all sides of steel panels. Two of the primer coated panels were then brought together at their coated surfaces and placed in a spot welding device. Four volts were applied across the plates from a ⅝ inch diameter spot welding electrode, the conducting path formed by the metal plates and the primer coatings easily permitted 8,000 to 10,000 amperes to pass with four volts. The welded plates were removed and the welded junction manifested extremely good qualities. The resultant 2-mil coating was then baked for 45 minutes at 300° F.

*Example VI*

| | Parts by weight |
|---|---|
| Calcium chromate | 8.6 |
| Magnesium silicate (talc) | 8.0 |
| Calcium hydroxide | 8.0 |
| Zinc oxide | 3.6 |
| Lamp black pigment (Molacco black) | 4.6 |
| Suspending agent (MPA, multi-purpose additive, Baker Castor Oil Company) | 1.7 |
| Epoxy resin (Epon 834–X–90) | 24.5 |
| Product of Example I | 81.1 |
| Xylene | 162.4 |
| Toluene | 80.5 |

The above ingredients were homogeneously mixed and allowed to gel over a 24-hour period. An electricaly conductive, corrosion-resistant coating composition was then made by adding zinc particles (595.7 parts) to the above gelled composition (383.0 parts) and mixing them until a homogeneous composition was obtained. Using a high pressure pump, this composition was sprayed as before at 15 pounds per square inch pot pressure and 60 pounds atomizing pressure onto all sides of steel panels. Two of the primer coated panels were then brought together at their coated surfaces and placed in a spot welding device. Four volts were applied across the plates from the ⅝ inch diameter spot welding electrode. The conducting path formed by the metal plates and the primer coatings easily permitted 8,000 to 10,000 amperes to pass with four volts. Welded plates removed and a welded junction manifested extremely good qualities. The resultant two mil coating was then baked for 45 minutes at 300° F.

*Example VII*

| | Parts by weight |
|---|---|
| Calcium chromate | 4.43 |
| Magnesium silicate (talc) | 4.32 |
| Lamp black pigment (Molacco black) | 1.67 |

*Example VII*—Continued

| | Parts by weight |
|---|---|
| Hydrated lime (calcium hydroxide) | .003 |
| Suspending agent (multi-purpose additive, Baker Castor Oil Company) | ,006 |
| Product of Example III (solid) | 20.50 |
| Hexone (methyl isobutyl ketone) | 41.20 |
| Xylene | 27.871 |

The above ingredients were homogeneously mixed and allowed to gel over a 24-hour period. An electrically conductive, corrosion-resistant coating composition was then made by adding zinc particles (65.3 parts) to the above gelled composition (34.7 parts) and mixing them until a homogeneous composition was obtained. Using a high pressure pump this composition was sprayed using 15 pounds per square inch pot pressure and 60 pounds atomizing pressure onto all sides of the steel panels. Two of the primer coated panels were then brought together at their coated surfaces and placed in a spot welding device. The coated panels were then welded using four volts. The welded plates were removed and the welded junction manifested extremely good qualities. The welded coated panels were then baked for 45 minutes at 300° F.

*Example VIII*

| | Parts by weight |
|---|---|
| Calcium chromate | 4.43 |
| Magnesium silicate (talc) | 4.32 |
| Lamp black pigment (Molacco black) | 1.67 |
| Hydrated lime (calcium hydroxide) | .003 |
| Suspending agent (MPA, multipurpose additive, Baker Castor Oil Company) | .006 |
| Hexone (methyl isobutyl ketone) | 15.20 |
| Xylene | 53.871 |
| Product of Example II | 20.50 |

The above ingredients were homogeneously mixed and allowed to gel over a 24-hour period. An electrically conductive, corrosion-resistant coating composition was then made by adding zinc particles (65.3 parts) to the above gelled composition (34.7 parts) and mixing them until a homogeneous composition was obtained. The coating composition was then applied to steel panels as in Example VI and the plates were welded as in Example VI with the same results. The welded coated panels were then baked for 45 minutes at 300° F.

*Example IX*

The baked coated panels of Examples IV, V, VI, and VII, together with a panel coated with a standard alkyd base welding primer which had been fully baked, were tested for 300 hours in a humidity chamber which was kept at 100 percent humidity and 100° F. The panels coated with the standard alkyd resin welding primer failed within 24 hours while the film on those panels coated with the compositions of the instant invention (Examples IV, V, VI and VII) were still intact after the 300 hours.

*Example X*

A typical zinc containing formulation which may be sprayed as such or further reduced in solids content is set forth as follows:

| | Parts by weight |
|---|---|
| Calcium chromate | 0.82 |
| Magnesium silicate (talc) | 0.80 |
| Zinc oxide | 1.34 |
| Lamp black pigment (Molacco black) | 0.31 |
| Suspending agent (multi-purpose additive, Baker Castor Oil Company) | 0.12 |
| Melamine formaldehyde resin | .06 |
| Resinous product of Example I | 2.77 |
| Epoxy resin (Epon 834) | 0.80 |
| Hydrated lime | 0.01 |
| Xylene | 40.29 |
| Butanol | .03 |
| Methyl isobutyl ketone | 5.65 |
| Zinc particles | 47.0 |

Where the spraying equipment does not have a sufficiently strong pumping mechanism, it may be desirable to add from about 5 percent to 7 percent by weight of the above formulation of the solvent system set forth in the said formulation. It has been found that the formulation set forth in Example X manifests extremely good corrosion resistance and remained free from attack after 400 hours in an environment of 100 percent humidity at 100° F.

While specific examples of the invention have been described hereinabove, it is not intended to limit the invention thereto, but to include all of the variations and modifications which are within the scope of the appended claims.

We claim:

1. The composition comprising (1) an interpolymer which comprises (*a*) at least one member of the group consisting of a styrene, an alkyl ester of acrylic acid, and an alkyl ester of an alpha-alkyl acrylic acid, and (*b*) from 0.25 percent to 5 percent by weight based on said interpolymer of an alpha, beta-ethylenically unsaturated carboxylic acid having 1 to 2 carboxyl groups;

(2) at least 40 percent by weight based on the total composition of zinc particles; and (3) 0.007 percent to 5 percent by weight based on the total composition of an alkaline compound selected from the group consisting of oxides, hydroxides, and carbonates of soap-forming metals.

2. The composition of claim 1 wherein calcium chromate is included as an added component.

3. The composition of claim 1 in which the alkaline compound is an alkaline earth metal hydroxide.

4. A composition comprising (1) an interpolymer of styrene, an alkyl acrylate, and 0.25 percent to 5 percent by weight based upon the interpolymer of an alpha, beta-ethylenically unsaturated carboxylic acid having 1 to 2 carboxyl groups;

(2) at least 40 percent by weight based upon the total composition of zinc particles; and (3) from 0.007 percent to 5 percent by weight based upon the total composition of an alkaline compound selected from the group consisting of oxides, hydroxides, and carbonates of soap-forming metals.

5. A composition comprising (1) an interpolymer comprised of (*a*) at least one member of the group consisting of a styrene, an alkyl ester of acrylic acid, and an alkyl ester of an alpha-alkyl acrylic acid; (*b*) from 0.25 percent to 5 percent by weight based upon the interpolymer of an alpha, beta-ethylenically unsaturated carboxylic acid having 1 to 2 carboxyl groups; and (*c*) a nitrile of an ethylenically unsaturated carboxylic acid;

(2) at least 40 percent by weight based on the total composition of zinc particles; and (3) from 0.007 percent to 5 percent by weight based on the total composition of an alkaline compound selected from the group consisting of oxides, hydroxides, and carbonates of soap-forming metals.

6. The composition of claim 5 in which said nitrile is acrylonitrile.

7. The composition of claim 5 in which said interpolymer is comprised of styrene, an alkyl acrylate, acrylonitrile, and an alpha, beta-ethylenically unsaturated carboxylic acid having 1 to 2 carboxyl groups.

8. The composition of claim 5 in which said interpolymer is comprised of methyl methacrylate, ethyl acrylate, acrylonitrile, and an alpha, beta-ethylenically unsaturated carboxylic acid having 1 to 2 carboxyl groups.

9. The composition of claim 5 wherein there is included as an added component a polyether derivative of a polyhydric phenol containing epoxide groups.

10. An article comprising a metal surface having thereon an electrically-conductive coating which is a cured film of a composition comprising (1) an interpolymer which comprises (*a*) at least one member of the group consisting of a styrene, an alkyl ester of acrylic acid, and an alkyl ester of an alpha-alkyl acrylic acid, and (*b*) from 0.25 percent to 5 percent by weight based on said interpolymer of an alpha, beta-ethylenically unsaturated carboxylic acid having 1 to 2 carboxyl groups;

(2) at least 40 percent by weight based on the total composition of zinc particles; and (3) 0.007 percent to 5 percent by weight based on the total composition of an alkaline compound selelected from the group consisting of oxides, hydroxides, and carbonates of soap-forming metals.

References Cited in the file of this patent

UNITED STATES PATENTS

| | | |
|---|---|---|
| 2,510,727 | Sussenbach | June 6, 1950 |
| 2,759,910 | Milne et al. | Aug. 21, 1956 |
| 2,794,791 | Patton et al. | June 4, 1957 |
| 2,875,166 | Hopkins | Feb. 24, 1959 |
| 3,068,183 | Strolle | Dec. 11, 1962 |

OTHER REFERENCES

Mattiello: "Protective and Decorative Coating," vol. II, John Wiley & Sons., Inc., 1942 (pp. 382–3 relied on).